United States Patent [19]
Sato et al.

[11] Patent Number: 4,831,450
[45] Date of Patent: May 16, 1989

[54] STILL CAMERA SYSTEM USABLE FOR BOTH FILM AND ELECTROPHOTOGRAPHY

[75] Inventors: Kazuchika Sato, Kobe; Nobuyuki Taniguchi, Nishinomiya, both of Japan

[73] Assignee: Minolta Camera Kabushiki Kaisha, Osaka, Japan

[21] Appl. No.: 130,198

[22] Filed: Dec. 8, 1987

[30] Foreign Application Priority Data

Dec. 9, 1986 [JP] Japan ................ 61-292872

[51] Int. Cl.$^4$ .......................................... H04N 5/225
[52] U.S. Cl. .................................. 358/209; 358/229
[58] Field of Search ............... 358/209, 909, 906, 229, 358/160

[56] References Cited

U.S. PATENT DOCUMENTS 4,499,504 2/1985 Edakubo ............................. 358/229

FOREIGN PATENT DOCUMENTS 97032 12/1983 European Pat. Off. ............ 358/909
59-104132 7/1984 Japan .
62-147963 9/1987 Japan .

Primary Examiner—Tommy P. Chin
Attorney, Agent, or Firm—Burns, Doane, Swecker & Mathis

[57] ABSTRACT

A still camera system comprises a camera body together with either a back for film or a still video back which are selectively mountable onto the camera body. When the still video back is mounted, a part of light incident on an image pickup CCD is directed to a photoelectric conversion element provided in the still video back. An output current of the photoelectric conversion element is converted into a voltage by a conversion circuit, and the voltage is transmitted to the camera body. When the back for film is mounted, light reflected from the film is received by a photoelectric conversion element provided in the camera body, and an output current in the photoelectric conversion element is converted into a voltage by a conversion circuit in the camera body. Based on an output of an operation switch responsive to the mounting of the still video back onto the camera body, one of the output voltages in the two conversion circuits is selected by a selection switch, the selected voltage is integrated by an integration circuit, and, when an integrated value reaches a predetermined level, a disable signal is transmitted to a flash unit. Flash control is thus effected both when the still video back is mounted or when the back for film is mounted.

2 Claims, 4 Drawing Sheets

STILL CAMERA SYSTEM USABLE FOR BOTH FILM AND ELECTROPHOTOGRAPHY

BACKGROUND OF THE INVENTION

1. Field of the invention

The present invention relates to a still camera system, more particularly to a still camera system which is designed to permit selectively mounting a still video back having a solid image pickup element for picking up still images and a back for film onto a camera body.

2. Description of the Prior Art

Electronic still cameras for recording on a magnetic recording disk the still images picked up with a solid image pickup element such as CCD (charge coupled device) are known, as introduced for example in "Nikkei Electronics", pages 80 to 85, issued on July 2, 1984 in Japan. The present applicant also previously filed an application on a still camera of a system to mount a still video back selectively onto a camera body, as Japanese Utility Model Application No. 36821/1986. According to said system, a still video back containing a solid image pickup element and an image processing circuit, etc. is interchangeably mountable onto a camera body carrying an ordinary back for film, and when it is mounted on the camera body, the whole unit is compact to provide an image resembling that of the commercially available still cameras. When a back for film is mounted in place of the still video back, the camera is usable as an ordinary still camera to give exposures on a film.

By the way, in an ordinary camera using a 35 mm roll film, in actuating an electronic flash unit there is in practice to adjust the amount of the flash light of the flash unit.

In FIG. 1 there is shown an example of a camera and an electronic flash unit to which such prior art is applied. In FIG. 1, the part 1 shows a camera body, and the part 2 an electronic flash unit. The camera body 1 is furnished with a photoelectric conversion element ($D_1$) arranged to be sensitive to the light reflected by the film 3 out of the light incident on the camera inside through the interchangeable taking lens; a conversion circuit 5 for logarithmically compressing the output current of the photoelectric conversiion element ($D_1$) into a voltage by a diode ($D_2$) and an operation amplifier 4; an adder 6 for adding the film speed voltage ($S_v$) set in proportion to the film speed to the aforementioned voltage after conversion; a transistor ($Q_1$) for logarithmically extending said output voltage; a capacitor ($C_1$) for integrating the logarithmically extended current; a switch ($S_1$) for controlling the integrating action of said capacitor ($C_1$); and a comparator 7 for comparing the charge voltage of said capacitor ($C_1$) with the predetermined proper exposure level ($V_1$). Further, the camera body 1 is furnished with an X contact ($S_x$) which is put ON when, for example, the running of the first curtain of the focal plane shutter has been completed to make the shutter fully open; a first terminal ($T_1$) for giving the flash start signal ($ST_1$) produced by switching ON the X contact ($S_x$) to the electronic flash unit 2; an inverter 8 for inverting the signal ($ST_2$) given from the electronic flash unit 2 through the second terminal ($T_2$) to give it to the control terminal ($T_7$) of the switch ($S_1$); and a third terminal ($T_3$) for transmitting a flash stopping signal ($ST_3$) produced from the comparator 7 to the side of the electronic flash unit 2. On the other hand, the electronic flash unit 2 has a flashing section 9 including a xenon tube 10; a flash stopping section ($S_2$) to be put O by the aforesaid flash stopping signal ($ST_3$); a flash starting section ($S_3$); a comparator 11 for comparing the charged voltage of the main capacitor in the flashing section 9 with the predetermined fixed voltage ($V_2$); an inverter 13 for inverting the low level signal produced by switching ON the main switch ($S_4$) for the electronic flash unit to the high level signal and applying to the second input ($I_2$) of an AND gate 12; a timer circuit 14 for outputting a low level signal for a certain duration under the aforesaid flash starting signal; an inverter 15 for converting the low level flash starting signal into the high level and giving it to the flash starting section ($S_3$); and the 4th, 5th, and 6th terminals ($T_4$), ($T_5$), and ($T_6$) corresponding to the first, second, and third terminals ($T_1$), ($T_2$), and ($T_3$). To the first input ($I_1$) of the aforesaid AND gate 12 the output of the aforesaid comparator 11 is exerted, and to the third input ($I_3$) the output of the timer circuit 14 is exerted, respectively.

Then, to explain the operation, when the electronic flash main switch ($S_4$) is put ON, the point (a) comes to have an earth potential. However, as the inverter 13 converts it into a high level, the second input ($I_2$) of the AND gate 12 assumes a high level. Also, the third input ($I_3$) of the AND gate 12 is on a high level, because the flash starting signal ($ST_1$) has not reached the fourth terminal ($T_4$). When, under such a condition, charging to the main capacitor in the electronic flash unit is completed and a high level signal is given to the first input ($I_1$) of the AND gate 12 from the comparator 11, a high level signal is outputted from the AND gate 12, and the said output is inverted to a low level by the inverter 8 in the camera body 1. As a result, the switch ($S_1$) assumes a state of being turned ON to short-circuit the capacitor ($C_1$).

Then, when the shutter release button is pressed and, simultaneously with full opening of the shutter, the X contact ($S_x$) is put on to generate the low level flash starting signal ($ST_1$), a low level signal is generated from the timer circuit to turn the output of the AND gate 12 to a low level. Accordingly, a high level signal is applied to the control terminal ($T_7$) of the switch ($S_1$) through the inverter 8 to make the swtich ($S_1$) OFF state. On the other hand, in the electronic flash unit 2, the flash starting signal ($ST_1$) is converted by the inverter 15 into a high level and applied to the flash starting section ($S_3$). As a result, the flash starting section ($S_3$) is switched ON to have the flashing section 9 flash. With the flashing of the electronic flash unit, the light reflected from the object comes into the camera body through the interchangeable lens (taking lens), and a part of it is reflected by the film 3 to reach the photoelectric conversion element ($D_1$). The photoelectric conversion element ($D_1$) outputs the current proportionate to the intensity of light on the film face. This output current is modified into a logarithmically compressed voltage by the conversion circuit 5, followed by combination with the film speed voltage ($S_v$) by the adder 6 and added to the base of the transistor ($Q_1$). The output current generated on the collector side of the transistor ($Q_1$) charges the capacitor ($C_1$). The charge voltage of this capacitor ($C_1$) corresponds to the exposure level. When the capacitor ($C_1$) goes on being charged and its charge voltage reaches the proper exposure level ($V_1$), the output of the comparator 7 comes to a high level. This high level acts as a flash stopping signal ($ST_3$) on the flash stopping section ($S_2$) to stop flashing of the xenon tube 10. In the manner as described, on attainment of the proper exposure level, flashing of the electronic flash unit is stopped to complete the light adjusting operation of the electronic flash unit.

However, when the condition is such that, instead of the back for film, a still video back is mounted on the camera body, because of the lack of the reflecting object on the position corresponding to the film surface, flash level adjusting operation of the electronic flash unit is not feasible with the conventional construction as above.

SUMMARY OF THE INVENTION

Accordingly, it is an object of the present invention to provide a still camera system in which it is possible to adjust flash level of the electronic flash unit even when a still video back is mounted on the camera body.

Briefly speaking, the present invention covers a still camera system which is so designed that, when a still video back is mounted, a part of the light incident on the solid image pickup element is led to a light receiving element by a diverging means in the still video back, the output current of the light receiving element is converted into a voltage by a conversion means, and then said voltage is led to the camera body through a transmitting means; on the other hand, when a back for film is mounted, the reflected light from the film is caught by the light receiving means provided on the camera body, the output voltage of said light receiving means is converted into a voltage by another conversion means, and, based on the output of a means of responding to the mounting of the still video back to the camera body, one of the aforesaid two conversion means is selected by the selection means, and the selected voltage is integrated by an integrating means, so that, when the said integrated amount reaches the predetermined level, a signal to stop flashing of the electronic flash unit is supplied to the electronic flash unit. Thus, according to the present invention, the light adjusting operations can be realized not only when the back for film is mounted but also when the still video back is mounted. This means that it is possible to pick up on the solid image pickup element fine quality still images which had hitherto been impossible to realize especially under the taking conditions requiring flash.

In order to attain the abovementioned object and other objects, in a preferred embodiment to be adopted by the still camera system of the present invention, firstly there is so constructed that the still video back and the back for film may be selectively mounted to the camera body. In this case, the back for film plays a roll of the back lid of the camera body.

The still video back is provided with a half mirror for diverging a part of the incident light on the CCD as a sold image pickup element of the still video back; a first photoelectric conversion element for receiving the diverged light as above; a first conversion circuit for converting the output current of the above photoelectric conversion element into voltage; and a means of transmitting the converted voltage as above to the camera body. On the other hand, the camera body is provided with a second photo-electric conversion element for receiving the reflected light from the film face when the back lid of the camera body is mounted as a back for film to the camera body; a second conversion circuit for converting the output current of the above second photoelectric conversion element into voltage; a means of responding to the mounting of the still video back to the camera body; a selection switch for selectively outputting the output of one of the first conversion circuit and the second conversion circuit proportionate to the output of the above responding means; an integration circuit for integrating the current proportionate to the output voltage from the selection switch; and a means of transmitting the signal for stopping flash to the electronic flash unit when the integrated amount reaches the predetermined level.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

Figure 1:
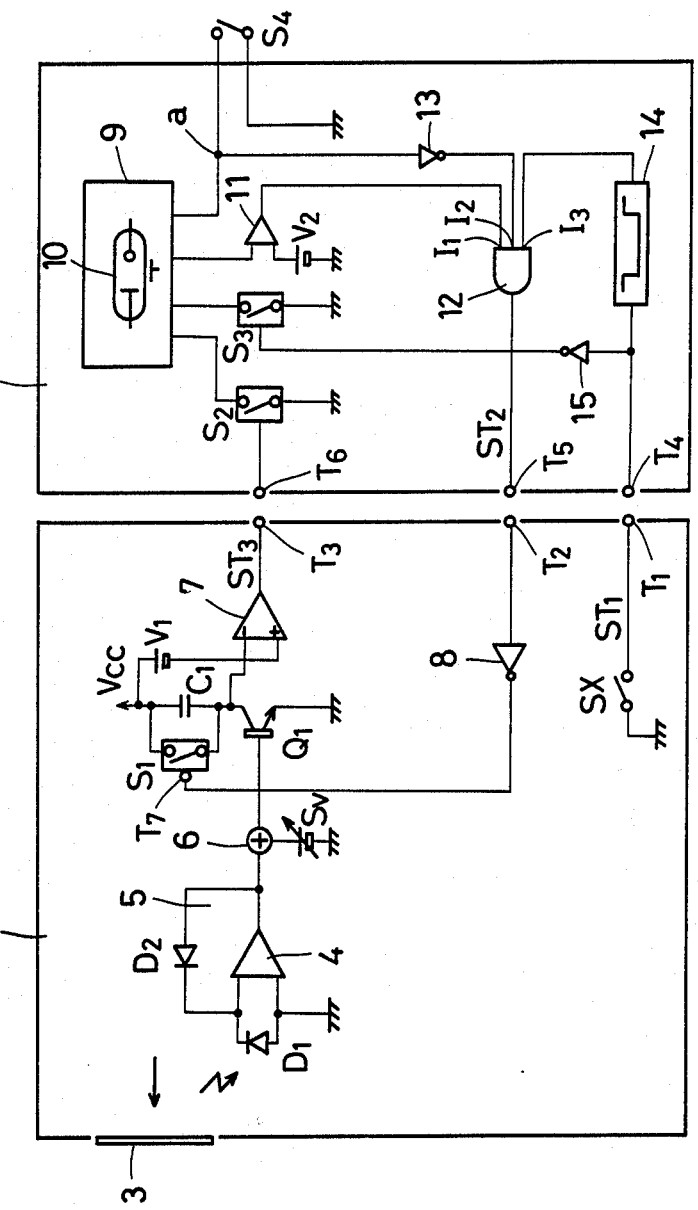
FIG. 1 is a circuit diagram showing the one employed in conventional still camera system.
Figure 2:
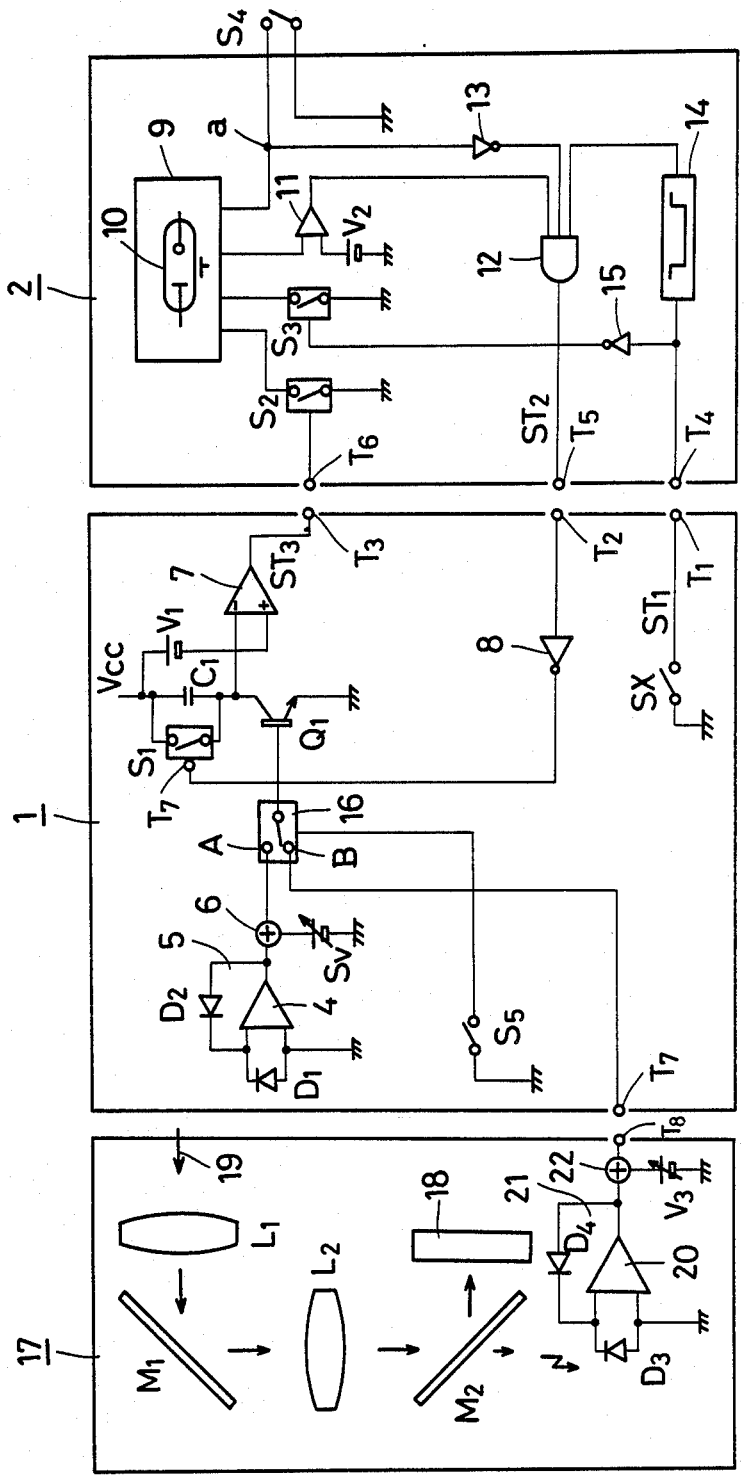
FIG. 2 is a circuit diagram for the still camera system to which the present invention is applied.

In FIG. 2 to which the present invention is applied, the same parts as in FIG. 1 are indicated by the same marks. The electronic flash unit 2 itself is the same as hitherto, but the camera body 1 is provided with a selection switch 16 between the adder 6 and the transistor ($Q_1$), with addition of an operation switch ($S_5$) for controlling selection of said selection switch 16. The operation switch ($S_5$) is put OFF while the back for film is mounted, with the selection switch 16 selected to the contact A side. When the still video back is mounted, the operation switch is put ON to select the selection switch 16 to the contact B side. The contact A is connected to the adder 6, and the contact B to the terminal ($T_7$). The still video back 17 includes a solid image pickup element 18 such as CCD, a signal processing circuit for processing the output of the solid image pickup element, a recording circuit, a magnetic disk as a recording medium, etc. Besides these components, the still video back is furnished with various elements as illustrated. To explain them, the part ($L_1$) is a condenser lens for condensing the light 19 from the object transmitted through the taking lens, ($M_1$) is a full reflection mirror, and ($L_2$) is an image focusing lens. The part 18 is the aforementioned solid image pickup element, constituted by CCD, MOSIC, etc. The part ($M_2$) is a light diverging means comprising a half mirror for diverging the light which has passed through the image focusing lens ($L_2$) in two directions, one being the direction toward the solid image pickup element 18, and the other being the direction toward the photoelectric conversion element ($D_3$). The conversion circuit 21 and the adder 22 comprising a logarithmic compression diode ($D_4$) connected to the photoelectric conversion element ($D_3$) and an operation amplifier 20 have the same construction as the conversion circuit 5 and the adder 6 disposed inside the camera body. As the one corresponding to the film speed voltage (Sv), there is provided a voltage (V$_3$) which is made to meet the sensitivity of the solid image pickup element. The output of the aforesaid adder 22 is given to the terminal (T$_8$).

In FIG. 2, when the still video back 17 is mounted on the camera body 1, the operation switch (S$_5$) is turned ON to set the selection switch 16 to the contact B side, by which there is provided a condition ready for the output of the adder 22 of the still video back 17 given through the terminals (T$_8$) and (T$_7$) to be led to the transistor (Q$_1$) through the selection switch 16. Under this condition, when the flashing section 9 flashes, the light 19 reflected from the object passes through the condenser lens (L$_1$), full reflection mirror (M$_1$), image focusing lens (L$_2$), and light diverging means (M$_2$) to form an image on the solid image pickup element 18. Also, the light simultaneously diverged by the light diverging means (M$_2$) to a direction different from the solid image pickup element 18 is led to the photo-electric conversion element (D$_3$). At this time, the amount of light incident on the photoelectric conversion element (D$_3$) and the amount of light incident on the solid image pickup element 18 are proportioned with each other. The output current generated in the photo-electric conversion element (D$_3$) is logarithmically compressed in the conversion circuit 21, added to the voltage (V$_3$) matching the sensitivity of the solid image pickup element, and sent to the camera body side through the terminals (T$_8$) and (T$_7$).

On the camera body 1 side, the signal sent from the still video back 17 side is led to the transistor (Q$_1$) for extension through the selection switch 16 to charge the capacitor (C$_1$). When the charge amount reaches the proper exposure level, a flash stopping signal is outputted from the comparator 7. The subsequent operation steps are the same as those given in FIG. 1. In this manner, the light adjusting operation for the electronic flash unit for the camera body mounted with the still video back 17 is completed.

The above voltage (V$_3$) is so adjusted that the flash stopping signal (ST$_3$) is outputted when the amount of exposure to the solid image pickup element face comes to a proper exposure level.

In this embodiment, when the back for film is mounted, the operation switch (S$_5$) is turned OFF and the selection switch 16 is selected to the contact A side, so that the light adjusting operations are made in the same manner as in FIG. 1.

The switch (S$_5$) may be a switch means to be selected by reading the electric signal sent to the camera body from the still video back through the terminal for data communication (not illustrated).

Figure 3:
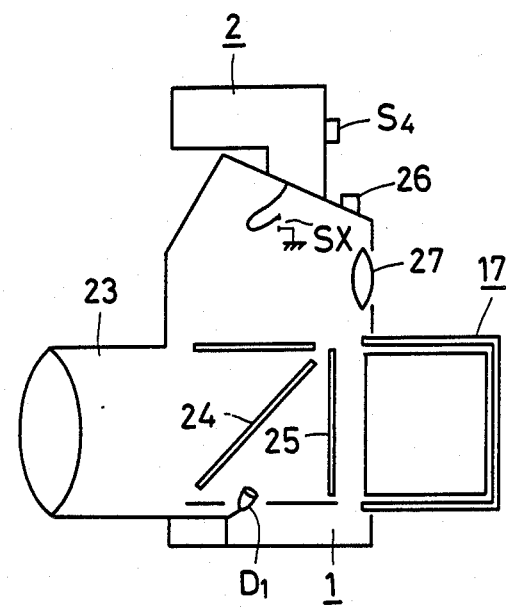
FIG. 3 is a schematic diagram showing in lateral section the state of a still video back mounted on the camera body in the still camera system to which the present invention is applied.
Figure 4:
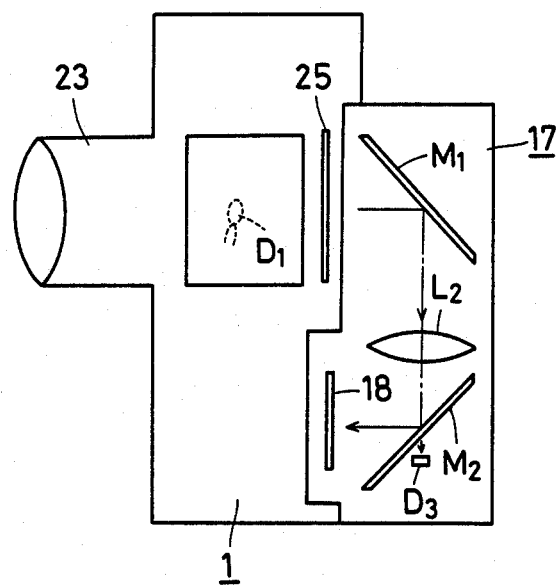
FIG. 4 is a schematic view showing the like state in plan view.

FIG. 3 schematically shows a condition where the still video back is mounted on the camera body 1 in lateral section, and FIG. 4 likewise schematically shows the same in plane section.

The part 24 is a half mirror for diverging a part of the light incident on the inside of the camera body 1 through an interchangeable taking lens 23. The diverged light is led to the ocular lens 27 through the light leading out means which is not shown. The part 25 is a focal plane shutter, and 26 is a release button.

Figure 5:
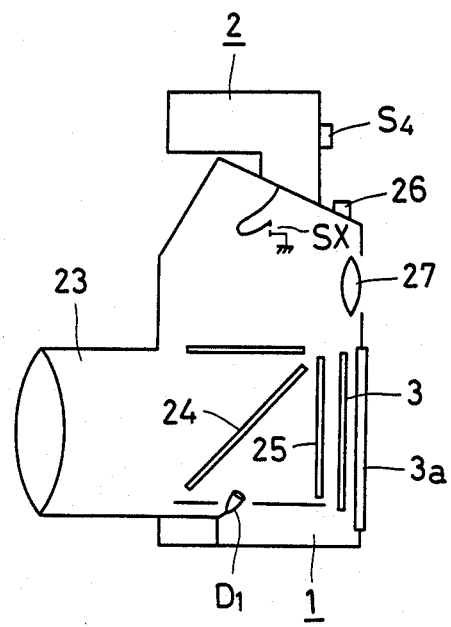
FIG. 5 is a schematic view showing in lateral section the state of a back for film mounted on the camera body in the still camera system to which the present invention is applied.

Then, FIG. 5 schematically shows in lateral section the condition where the film 3 is loaded on the camera body 1, with the back for film 3a mounted. In this case, the back for film 3a is a back lid mounted on the camera body 1.

The camera body 1 has a microcomputer for control for giving control signals to the mechanisms of various parts of camera and receiving signals from those parts. The still video back 17 also has a microcomputer, through which it gives various kinds of information held by it to the microcomputer on the camera body side. Accordingly, the mounting of the still video back 17 can be judged by the receipt of information by the microcomputer on the camera body 1 side from the still video back 17. In such a case, the operation switch (S$_5$) in FIG. 2 is constituted by the microcomputer per se. On the other hand, the mounting of the back for film 3a can be judged by the abovementioned microcomputer, because no information from the back for film 3a is given. It is of course possible to construct the operation switch (S$_5$) not by a microcomputer as described above but by a mechanical switch.

While the invention has been described with reference to the preferred embodiment, it should be understood that the present invention is not limited to the given embodiment but may be subject to various alterations and modifications within the scope that does not diverge from the purport of the invention.

What is claimed is:

1. A still camera system comprising a camera body along with a back for film and a still video back which are selectively mountable on said camera body, said still video back having:

a solid image pickup element for receiving a light from an object to be photographed;

means for diverting a part of the light incident on said element;

first light receiving means for receiving said diverted light and generating a first output current;

first conversion means for converting said first output current of said first light receiving means into a first voltage; and means for transmitting said first voltage to the camera body;

and further said camera body having:

second light receiving means for receiving reflected light from a film face when the back for film is mounted on the camera body and generating a second output current;

second conversion means for converting the second output current of said second light receiving means into a second voltage;

means for responding to the mounting of the still video back on the camera body;

selection means for selectively outputting one of said first voltage from said first and said second voltage from said second conversion means according to an output of said responding means;

integrating means for integrating an electrical current proportionate to said one output voltage from said selection means; and means for transmitting a signal to an electronic flash connected to the camera body when an amount of integration by said integrating means comes to a predetermined level thereby stopping light emission of the electronic flash unit.

2. A still camera system according to claim 1, wherein the still video back further comprises means for outputting a first sensitivity signal corresponding to a sensitivity of the solid image pickup element, and means for adding said first sensitivity signal to the first voltage of said first conversion means so as to obtain a converted voltage transmitted by said transmitting means of the still video back to the camera body, and wherein the camera body further comprises means for outputting a second sensitivity signal corresponding to a film speed in use, and means for adding said second sensitivity signal to the converted voltage of said second conversion means so as to obtain the voltage outputted from the second conversion means.

* * * * *